(12) United States Patent
Franck

(10) Patent No.: US 6,172,890 B1
(45) Date of Patent: Jan. 9, 2001

(54) HALF BRIDGE CIRCUIT DRIVE WITHOUT COLLECTOR BIAS CURRENT PEAK

(75) Inventor: Felix Franck, Munich (DE)

(73) Assignee: Patent-Treuhand-Gesellschaft fuer elektrische Gluehlampen mbH, Munich (DE)

( * ) Notice: Under 35 U.S.C. 154(b), the term of this patent shall be extended for 0 days.

(21) Appl. No.: 09/446,753
(22) PCT Filed: Jun. 9, 1998
(86) PCT No.: PCT/DE98/01561
 § 371 Date: Dec. 27, 1999
 § 102(e) Date: Dec. 27, 1999
(87) PCT Pub. No.: WO99/01934
 PCT Pub. Date: Jan. 14, 1999

(30) Foreign Application Priority Data

Jul. 3, 1997 (DE) .............................................. 197 28 295

(51) Int. Cl.[7] .............................. H02M 3/24; G05F 1/40; H05B 37/02
(52) U.S. Cl. .......................... 363/98; 323/282; 315/209 R

(58) Field of Search .................................. 363/17, 22, 97, 363/98, 132, 133; 323/271, 282, 285; 315/206, 209 R, 226, 291; 331/108 R, 110, 114

(56) References Cited

U.S. PATENT DOCUMENTS

| 4,279,011 | * | 7/1981 | Nilssen ................................. 363/133 |
| 4,959,591 | * | 9/1990 | Hirschmann ...................... 315/209 R |
| 5,309,350 | | 5/1994 | Kijima . |
| 5,402,087 | * | 3/1995 | Gorczak ............................... 331/117 |

FOREIGN PATENT DOCUMENTS

| 2553266 | 6/1977 | (DE) . |
| 0682464 | 11/1995 | (EP) . |
| 2016846 | 9/1979 | (GB) . |
| 2086164 | 5/1982 | (GB) . |

* cited by examiner

Primary Examiner—Matthew Nguyen
(74) Attorney, Agent, or Firm—Carlo S. Bessone

(57) ABSTRACT

By adding a base bridging capacitor (C6, C6') between the base connections of a bipolar transistor bridge oscillator, in particular of an electronic ballast for a low-pressure gas discharge lamp, the collector initial current peak is avoided, while ensuring that the switching transistors (T1, T2) are switched on, without any voltage, at the right time.

10 Claims, 1 Drawing Sheet

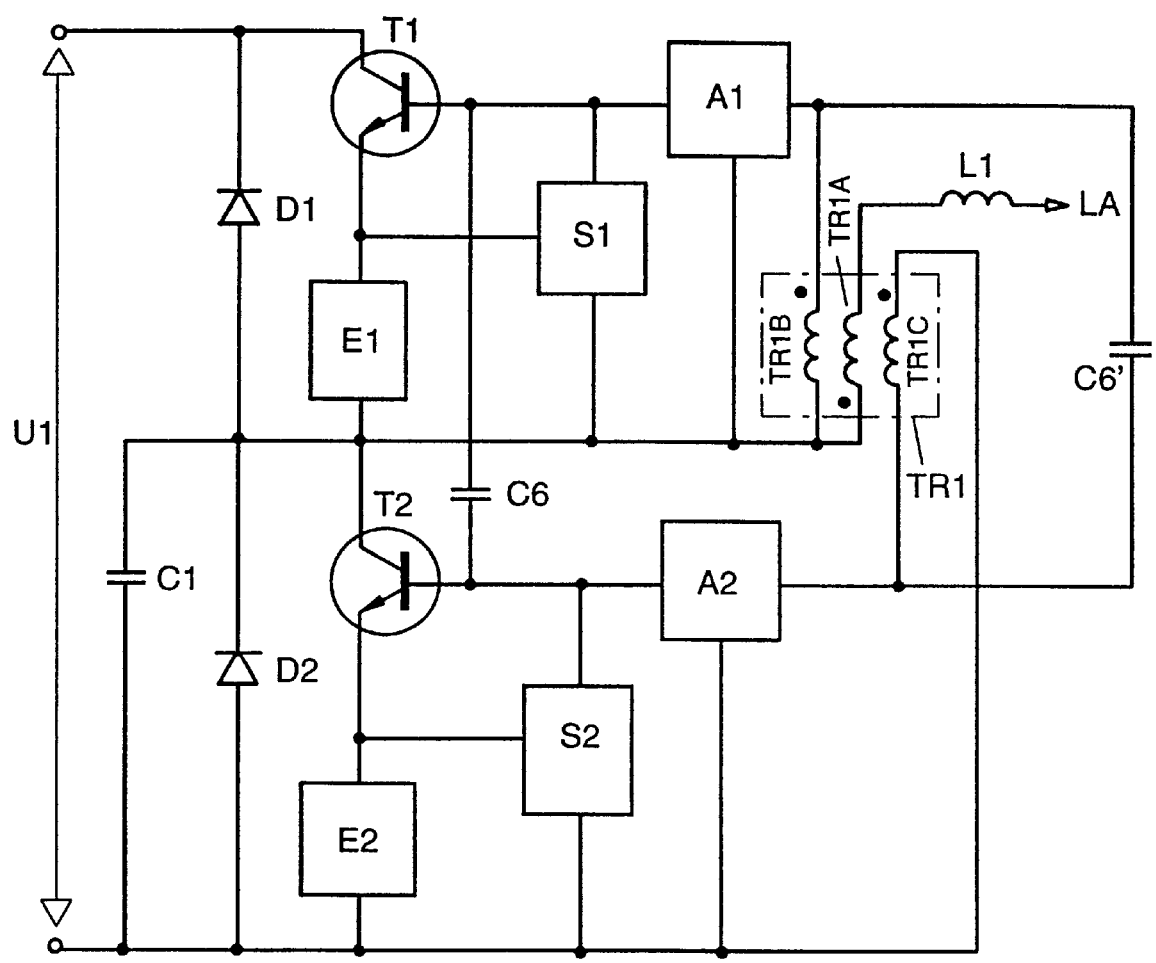

HALF BRIDGE CIRCUIT DRIVE WITHOUT COLLECTOR BIAS CURRENT PEAK

BACKGROUND OF THE INVENTION

The present invention relates to an operating circuit for a load, in particular a low-pressure discharge lamp.

In this case, the invention is based on an oscillator circuit for high-frequency operation of the load, in which case the circuit is supplied with a voltage with a dominant DC element. Specifically, a free-running oscillator circuit is considered, in which a bipolar transistor bridge is driven by means of a switching control device such that the process of switching the bipolar transistors on and off allows the potential of a bridge tap to oscillate at the operating frequency. To do this, with free-running oscillator circuits, the load current is fed back through the switching control device in order to switch and control the bipolar transistors.

A major problem in the design and—with regard to the tolerances—in the production of such a circuit is to consider three functional criteria simultaneously, namely radio suppression, relief of the transistor switching load and minimizing switching losses, and, finally, the power which is passed to the load. The relationship between these three criteria in conventional circuits is highly complex. Taking account of all three aspects at the same time is feasible either only on the basis of a very complex circuit design and with correspondingly tight tolerances with regard to the various electrical variables and operating parameters, or frequently cannot be achieved at all in a satisfactory manner.

SUMMARY OF THE INVENTION

The invention is based on the technical problem of developing the described circuit further such that the design of the circuit with regard to the said criteria is simplified, and the tolerances with regard to the electrical variables and operating parameters are widened.

This problem is solved according to the invention by means of a free-running oscillator circuit for operating a load having a bipolar transistor bridge and having a switching control device for transmitting the load current, with feedback, to the bases of the bipolar transistors wherein the base connecting lines of the bipolar transistors are in each case connected to one another, between the switching control device and the bipolar transistor, by means of at least one "base bridging capacitor".

The solution adopted with the circuit according to the invention is aimed, in particular, at the aspect of the collector initial current peak. This is an undesirable collector-emitter current which flows for a short time but with a relatively high amplitude when the base of a switching transistor under consideration is driven too early, that is to say the transistor is switched on too early. Too early in this case means that the collector-emitter voltage in the change in potential during the last oscillator half-cycle has not disappeared completely and thus still produces a short current surge if the transistor is switched on too early. If the transistor is switched on at the right time, that is to say starting only once the collector-emitter voltage has disappeared, no positive collector-emitter current flows whatsoever, and only a very much smaller base-collector current.

This collector initial current peak can occur in particular with base drives whose losses have been minimized, and in which the nominal switching-on time occurs very shortly after the collector-emitter voltage has disappeared and, correspondingly, small fluctuations in the electrical variables or operating parameters are a sufficient cause on their own.

The so-called "base bridging capacitor" which is added according to the invention between the base connecting lines of the bipolar transistors now results in the current, which possibly starts too early, for driving the base and switching on the transistor being "sucked away" so to speak. This is done by means of the base bridging capacitor which has not yet been entirely discharged or charged if the switching-on current starts too early.

To illustrate this, it can be stated that the connection points of the base bridging capacitor to the base connecting lines in each case occur essentially at a potential of the supply voltage or at the potential of the center tap of the bipolar transistor bridge owing to the fact that the impedances of the switching control device and of any further base drive circuits are generally low in comparison to the change in voltage of the oscillator circuit. In consequence, the time when the potential at the center tap and the respective potential of the supply voltage are identical can in practice be equated to the time when the base bridging capacitor is completely discharged or charged.

Even if the switching control device supplies a switching-on current which is possibly somewhat too early, this thus ensures that the transistor under consideration is switched without any voltage (with respect to the collector-emitter voltage), and thus with optimized losses.

Avoiding the current surge pulse of the collector initial current peak in general also results in improved electromagnetic compatibility.

The described method of operation means that the requirements for the switching mode criterion are considerably less stringent for the design of the overall circuit and ensure simplified and improved capabilities with regard to the two other said criterion of radio suppression and design for power in the load. In other words, the described protective mechanism of the base bridging capacitor according to the invention allows, in particular, the power in the load to be "decoupled", so to speak, from the two other criteria by appropriate dimensioning of the relevant components.

In one preferred embodiment, the bipolar transistor bridge is a half-bridge comprising two bipolar transistors. The switching control device is preferably a control transformer, whose secondary winding currents drive the transistor bases.

The connection points of the base bridging capacitor can be arranged directly at the respective transistor base or directly at the output on the base side of the switching control device, for example on a transformer secondary winding. The second solution is preferable if a relatively high-impedance drive is connected between the switching control device and the transistor base since, otherwise, an excessively high alternating-current short-circuiting effect could occur immediately between the base connections, at the operating switching frequency, through the base bridging capacitor. Two capacitors are also conceivable, which are each arranged in one of the two circuits. In general, the invention is not limited to a single base bridging capacitor, particularly in the case of a full-bridge circuit.

It has been found that the (total) capacitance of the base bridging capacitor or capacitors is best matched to the (total) capacitance of the conventional trapezoidal capacitor or capacitors in the overall circuit. In this case, the term trapezoidal capacitor refers to a capacitor which is (effectively) connected in parallel with a collector-emitter path for a switching transistor in order to reduce the gradient—on the potential/time graph—of the sudden potential changes at the bridge tap resulting from the corresponding charge-reversal processes. A preferred range for the capacitance of the base bridging capacitor is in this case 10% to 100% of the trapezoidal capacitor capacitance and, in particular, 10% to 50% of this capacitance.

A preferred range for the sum of the said (total) trapezoidal capacitor capacitance and the (total) capacitance of the base bridging capacitor or capacitors is between 680 pF and 2.2 nF. This applies to a wide range of load power levels between several watts and few kilowatts.

BRIEF DESCRIPTION OF THE DRAWINGS

The invention will be explained in more detail in the following text with reference to a preferred exemplary embodiment, in which case all the individual features disclosed here may also be essential to the invention on their own or in other combinations.

DESCRIPTION OF THE PREFERRED EMBODIMENTS

The FIGURE shows a schematic circuit diagram of an oscillator circuit according to the invention. On the left-hand side, a supply voltage U1 with a dominant DC element is supplied, for example, from a rectifier, with the lower line on the graph being the ground potential and the upper line a potential which is positive with respect to the ground potential. The supply voltage U1 is passed to a half-bridge comprising two bipolar transistors T1 and T2, whose center tap is passed to the right to the load LA, via a lamp inductor L1.

By switching the two transistors T1 and T2 on alternately, the potential at the center tap oscillates between the positive supply potential and ground, thus resulting in the high frequency power supply to the load LA. In this case, the load LA is normally connected to ground on its other side, but in some cases it is also connected to the positive supply path.

The oscillation of the half-bridge circuit is produced by positive feedback of the high-frequency load current via the control transformer TR1 (TR1A, TR1B, TR1C) shown. The outputs of the secondary windings TR1B and TR1C of the control transformer TR1 are connected to the base connections of the half-bridge bipolar transistors T1, T2; since the secondary windings of the control transformer are wound in opposite senses, this results in the two bipolar transistors being driven alternately. Drive circuits A1 and A2, respectively, which are shown as boxes, are located between the secondary winding output and the base input of the respective bipolar transistor T1 or T2, and may contain resistors, inductances, diodes and capacitances. The precise design of this drive circuit is of secondary importance to the invention and may correspond to the prior art.

Furthermore, the bipolar transistors are connected in the normal way. First of all, a free-wheeling diode D1 or D2, respectively, is connected back-to-back with respect to the emitter-collector path of each transistor, the function of which diodes is known and will not be described any further here.

Furthermore, emitter circuitry E1 and E2, respectively, is connected upstream of the emitter of each of the two bipolar transistors T1 and T2, whose detailed design is once again not of particular importance. This may be, for example, a simple non-reactive emitter resistance. However, it may also contain rectifying Schottky diodes or bipolar diodes and/or capacitances.

An emitter-based protective circuit S1 or S2, respectively, is connected in parallel with the base-emitter junction of each of the two bipolar transistors T1 and T2 and, once again, may comprise resistors, diodes and/or zener diodes. Once again, the detailed design is not significant to the invention dealt with here.

C1 denotes a trapezoidal capacitor which, in the present example, is connected in parallel with the emitter-collector path of the transistor T2, and which is likewise known from the prior art. It could also be connected in parallel with the emitter-collector path of the transistor T1, or a parallel trapezoidal capacitor could be provided in each case. The function of this trapezoidal capacitor C1 is to ensure that the potential rise at the center tap after one of the two bipolar transistors T1 and T2 has been switched off is not too sudden, by using the finite charging time of the capacitor to make the corresponding flank on the potential/time graph less steep.

In the exemplary embodiment described here, two base bridging capacitors C6 and C6' are provided, with the capacitor C6 connecting the base connections of the two bridge bipolar transistors T1 and T2 directly, and the capacitor C6' connecting the outputs on the base connection side of the secondary windings TR1B and TR1C of the control transformer TR1. In principle, the base bridging capacitor C6 can be connected directly to the base connections of the bipolar transistors T1 and T2, that is to say in the position of the base bridging capacitor on the left in the figure.

Thus, if the base bridging capacitor is arranged at the position C6, then the high-frequency short-circuiting function of the capacitance C6 between the base connections of the transistors T1 and T2 may, however, have an interfering effect—particularly if the drive circuits A1 and A2 shown as boxes have relatively high impedances—since C6 slows down the process of switching off the transistors T1 and T2. For example, when the transistor T2 switches off, its base potential is drawn to below its emitter potential but, directly after this and owing to the change in potential of the half-bridge center point via the secondary winding TR1B, moves the drive A1 and the capacitor C6 upward again.

However, the time control of the points at which the transistors switch on is more accurate with the switching position C6 than with the position at C6'. Accordingly, if the design emphasis for circuit design is aimed more at the rate at which the transistors are switched off, the position at C6' is preferable while, on the other hand, if the design emphasis is directed more at control of the switching-on time, the position at C6 is better.

As is shown in the figure, it is also possible to provide one capacitor in each of the two described positions, in which case the capacitances must be added to provide an effective overall base bridging capacitor capacitance.

The series circuit comprising the drive circuit A1 and the secondary winding TR1B, or comprising the drive circuit A2 and the secondary winding TR1C, has a relatively low impedance in each case (for example about 30 ohms together). The base bridging capacitor is thus effectively connected between the center tap and the lower supply path, that is to say ground, with the impedance of the drive circuits A1 and A2 becoming negligible for the base bridging capacitor C6'. Accordingly, a potential change at the center tap, that is to say at the point between the diodes D1 and D2 and at the collector of the lower bipolar transistor T2, results in the base bridging capacitor or capacitors C6 and/or C6' being charged and/or discharged, respectively. In this case, the current flows in the direction such that that transistor which is the next to be switched on during the oscillation is not driven until the potential change at the center tap has ended. As can be imagined, the charge-reversal processes of the base bridging capacitors suck up any base drive currents which may occur prematurely, provided the relevant transistor is not yet free of voltage (between the collector and emitter).

A further advantageous effect of the base bridging capacitors—particularly if the drives A1 and A2 have low impedances—is that any excess base depletion current, which causes considerable switching-off losses in the transistors, is likewise "sucked up" in the same way as the premature base drive current described above. In principle, this relates to the analog function for the described prevention of the collector initial current peak, but with the opposite mathematical sign for the current in the base, and for the switching-off time rather than the switching-on time.

This allows the design of the circuit to be deliberately configured for a slightly premature base drive, particularly with regard to the saturation of the control transformer TR1, which then, with the aid of the base bridging capacitor or capacitors, leads to the bipolar transistors T1 and T2 being switched on in a manner which is not sensitive to tolerances, occurs at an accurate time, and ensures they are free of voltage. In particular, the collector initial current peak described initially is effectively prevented.

Furthermore, the connection between the base bridging capacitor or capacitors C6 or C6' and the control transformer TR1 results in the latter being kept in saturation during the potential change at the center tap of the half-bridge. The charge-reversal current of the base bridging capacitor or capacitors C6 or C6' (as well as that of the trapezoidal capacitor C1) is forced to flow by the lamp inductor L1. In this case, the proportion of this current which reverses the charge on the base bridging capacitor or capacitors C6 or C6' also flows through all three windings of the control transformer TR1. It thus contributes three times to the magnetization of the main inductance of the control transformer TR1.

Finally, the already described relatively low-impedance coupling of the two poles of the base bridging capacitor or capacitors C6 or C6' to the half-bridge center tap and to the ground branch of the supply voltage means that the function of the conventional trapezoidal capacitor C1 is in each case taken over, or is handled jointly, by the base bridging capacitors C6 or C6' according to the invention. Accordingly, when the base bridging capacitor or capacitors C6 or C6' is or are added, the capacitance C1 should be reduced by the (total) base bridging capacitor capacitance. In principle, the conventional trapezoidal capacitor C1 could even be completely omitted although, as is evident from the preferred ratios of the sizes of the capacitances already stated above, this would mean that the base bridging capacitor capacitance according to the invention would in general be less than the optimum capacitance of a conventional trapezoidal capacitor.

What is claimed is:

1. A free-running oscillator circuit for operating a load, the circuit comprising:
   a bipolar transistor half-bridge having two bipolar transistors;
   two drive circuits that are each connected to a base of a different one of said two bipolar transistors;
   a switching control device having base-side outputs that are each connected to a different one of said two drive circuits, said switching control device transmitting a load current with feedback to the bases of said two bipolar transistors through said drive circuits; and
   a first base bridging capacitor that is connected to each said base-side output of said switching control device and that connects the bases of said two bipolar transistors to each other through said drive circuits and said first base bridging capacitor.

2. The circuit of claim 1, further comprising a second base bridging capacitor that is connected directly to the bases of said two bipolar transistors and that further connects the bases of said two bipolar transistors to each other through said second base bridging capacitor.

3. The circuit of claim 2, further comprising a trapezoidal capacitor that connects a center tap of said bipolar transistor half-bridge to ground.

4. The circuit of claim 1, further comprising a trapezoidal capacitor that connects a center tap of said bipolar transistor half-bridge to ground.

5. The circuit as claimed in claim 4, in which the capacitance of the first base bridging capacitor is 10 to 100% of the capacitance of said trapezoidal capacitor.

6. The circuit as claimed in claim 4, in which the capacitance of the first base bridging capacitor is 10 to 50% of the capacitance of one said trapezoidal capacitor.

7. The circuit as claimed in claim 4, in which the sum of the capacitances of the first base bridging capacitor and said trapezoidal capacitor is 680 pF to 2.2 nF.

8. The circuit as claimed in claim 1, in which the load is a low-pressure discharge lamp.

9. The circuit as claimed in claim 1, in which the switching control device is a control transformer.

10. A free-running oscillator circuit for operating a load, the circuit comprising:
    a bipolar transistor half-bridge having two bipolar transistors;
    two drive circuits having first terminals that are each connected directly to a base of a different one of said two bipolar transistors;
    a switching control device having base-side outputs that are each connected directly to a second terminal of a different one of said two drive circuits, said switching control device transmitting a load current with feedback to the bases of said two bipolar transistors through said drive circuits;
    a first base bridging capacitor that is connected directly to each said second terminal of said drive circuits and that connects the bases of said two bipolar transistors to each other through said drive circuits and said first base bridging capacitor; and
    a second base bridging capacitor that is connected directly to the bases of said two bipolar transistors and that further connects the bases of said two bipolar transistors to each other through said second base bridging capacitor.

* * * * *